United States Patent [19]
Malcolm

[11] Patent Number: 5,546,534
[45] Date of Patent: Aug. 13, 1996

[54] METHOD OF OPERATING A COMPUTER SYSTEM

[75] Inventor: Peter B. Malcolm, Devon, United Kingdom

[73] Assignee: Intelligence Quotient International Ltd., United Kingdom

[21] Appl. No.: 456,370

[22] Filed: Jun. 1, 1995

Related U.S. Application Data

[63] Continuation of Ser. No. 93,386, Jul. 19, 1993, abandoned.

[51] Int. Cl.$^6$ ................................................... G06F 13/00
[52] U.S. Cl. ................ 395/182.04; 395/600; 364/218.2
[58] Field of Search ........................... 364/268.2, 269.3; 395/600, 700, 425, 182.04

[56] References Cited

U.S. PATENT DOCUMENTS

| | | | |
|---|---|---|---|
| 5,065,354 | 11/1991 | Jons et al. | 395/575 |
| 5,163,148 | 11/1992 | Walls | 395/600 |
| 5,241,670 | 8/1993 | Eastridge et al. | 395/575 |

FOREIGN PATENT DOCUMENTS

| | | | |
|---|---|---|---|
| 0566964A2 | 10/1993 | European Pat. Off. | G06F 11/14 |
| 0566968A2 | 10/1993 | European Pat. Off. | G06F 11/14 |
| 0566964A3 | 10/1993 | European Pat. Off. | G06F 11/14 |
| 2230626 | 10/1990 | United Kingdom | G06F 15/40 |
| WO91/01026 | 1/1991 | WIPO | G06F 15/40 |
| WO93/08529 | 4/1993 | WIPO | G06F 11/14 |

*Primary Examiner*—Vincent P. Canney
*Attorney, Agent, or Firm*—Fish & Richardson P.C.

[57] ABSTRACT

A method of operating a computer system, in particular a micro-computer having a storage device shared between several application programs, comprises a backup process including a process for maintaining a record of changes made to the data on the storage device whilst the backup process is executing. The record is used to ensure that the data seen by the backup process does not change while it is executing whilst allowing other processes to continue to update the storage device normally thereby avoiding delays associated with file locking techniques.

The additional operations are executed at the level of the operating system interface of the microcomputer in such a manner that normal use of the computer is unaffected.

21 Claims, 3 Drawing Sheets

5,546,534

METHOD OF OPERATING A COMPUTER SYSTEM

This is a continuation of application Ser. No. 08/093,386, filed Jul. 19, 1993, now abandoned.

BACKGROUND OF THE INVENTION

This invention relates to a method of operating a computer system, and in particular to a method of providing backup copies of data stored in a storage device to guard against the possibility of the storage device becoming faulty or the data becoming corrupted, lost or, more recently, "infected by a computer virus". The invention is especially concerned with the provision of backups for personal computers (P.C.s).

Conventionally, in a simple, single user computer system comprising storage means such as a hard or fixed disk, only one application program has access to the storage means at any given time. The task of backing up data stored by the storage means is carried out by an application program which will have exclusive use of the storage means while carrying out the backup operation, since in such an environment no other application can operate until the backup application terminates.

With the introduction of multi-tasking environments which allow several applications to operate simultaneously, and of network systems, which allow several users to share the same resources, a situation may arise where more than one application has concurrent access to the same storage means. When this situation arises, there is a possibility of conflict between the applications. For example, one application might modify or delete a file currently being used by another application. This would lead to confusion and potentially to corruption of the storage means and consequently to loss of data.

Methods known as "file locking" and "record locking" have been introduced into operating systems to avoid, in the case of file locking, more than one application writing to a file or, in the case of record locking, two applications modifying the same area of a given file. These methods are sophisticated enough for most applications, particularly if each application only makes relatively minor changes to files which are shared and therefore does not significantly delay other applications wishing to access a file or record that is locked. However, an application for periodically backing up data in a computer system where the storage means are shared, is a special case.

The smallest unit of data that can be backed up is a single file, since neither the backup application nor the operating system has knowledge of the internal structure of a file because it could be associated with any application program.

In addition, the backup copy of the file needs to be an exact image of the original at a particular point in time. Copying a file is, however, not an instantaneous process and the time taken to copy will depend on the size of the file and the speed of the copying operation. This leads to a problem unless the backup application can be sure that no other application can modify the file during the copying process.

To copy a file, a backup application allocates an area of random access memory (RAM) as a transfer buffer and proceeds by alternately reading blocks of the source file into the buffer and then writing the buffer contents out to a secondary storage means. Unless the file is very small, the transfer buffer will fill up several times and the copying operation will require several read and write operations to make a complete copy of the file.

The potential problem caused by allowing the file to be modified during the copying process, may be illustrated by considering the example of a file which is being copied as a series of 10 blocks. If the file were to be modified by a transaction that required changes to the file which corresponded to blocks 3 and 8 after blocks 1 to 5 had already been copied, the copying process would subsequently copy the change to block 8 but would not copy the change to block 3 since this block had already been copied before the transaction occurred. The backup copy will therefore contain only a partial transaction which may make the backup copy entirely useless, since the application that "owns" it will probably consider the file to be corrupt.

U.S. Pat. No. 5,086,502 discloses a method of backing up each write operation as it is made by making a duplicate write operation to a secondary storage means. In addition to this method, there are two other ways of backing up files on a computer system having shared storage means:

i) Lock the file whilst backing up. This prevents other users from modifying the file by denying them write access. If another user already has write access, the backup application must either skip that file or wait until exclusive write access can be obtained.

ii) Detect modifications to the file. After copying the file, the backup application can use the operating system to check if any modifications were made during the copy operation. If modifications were made, then the copy must be repeated or that file skipped.

Neither of the latter two methods provides an adequate solution since many files (particularly database files) are constantly in use. Furthermore, the two methods require users to be effectively locked out while the backup takes place. Additionally, few secondary storage devices and operating system combinations are capable of sustained transfer rates of more than 15 megabytes (Mb) per minute and therefore the time taken to copy a large file is significant.

A few application programs do address the problem by providing methods of safely backing up their own files in a shared environment, but the procedure for each is different. To backup the whole storage means, the backup application therefore needs to know how each different built-in procedure works or must rely on manual intervention at an appropriate point.

Thus, since a backup application must backup a whole file and since this must not be modified by another application program during the backup process, the use of prior backup methods will introduce delays into a computer system having shared storage means. This is particularly true while large files are backed up.

SUMMARY OF THE INVENTION

According to a first aspect of the invention, a method of operating a microprocessor-based computer system including a random access memory, a central processing unit and storage means, comprises the steps of providing a backup process running on the computer system and which is operable to issue a start signal and a stop signal and to perform at least one backup read operation to read original data from the storage means, providing first instructions stored in said memory to said central processing unit to cause said central processing unit to perform at least one normal write operation to write data periodically to a primary area of said storage means, and at least one normal read operation to read data from said storage means, after receiving said start signal, performing an interception operation to intercept said write operation, and to write data to a secondary storage area of the storage means so as to preserve the original data which would otherwise be overwritten by said write operation, maintaining a record of said writing to the secondary area and, on performing one of said backup and normal read operations, interrogating said record to read data from one of the primary and the secondary storage areas according to the record, whereby the backup process is provided with preserved original data in the state it was in before said start signal was issued.

Preferably the record comprises a delta area in which the first data is stored and a mapping reference between the actual location of the first data and its intended location. Alternatively the second data may be recorded in the delta area and other applications may continue to write to the intended location on the storage device.

The delta area is preferably a different area of the same storage device which may for instance be a hard disk. The additional operations for performing the invention are advantageously stored and operated at an operating system interface level of the computer system.

If the software for performing the method of the invention is stored at the operating system level, it can be made transparent to the user so as not to affect application software.

As to the record, this may comprise a record of the first data, a record of its intended location on the storage device and a record of its actual location, and with the method further comprises the step of obtaining the second data from the intended location.

Preferably the start command is issued prior to the backup application program commencing a backup and preferably the stop command is issued after the backup has been completed.

This backup recording can be stored in a variety of storage means, for example a tape drive, optical disk, or in another area of the basic storage medium. Once the backup has been made it may be restored in conventional manner.

According to a second aspect of the invention, a method for providing data to a backup process executing on a microprocessor-based computer system, the system including a random access memory, a central processing unit and storage means, comprises the steps of providing first instructions stored in said memory to said central processing unit to cause said central processing unit to perform at least one normal write operation to write data periodically to a primary area of said storage means, and at least one normal read operation to read data from said storage means, receiving a start signal from the backup process, after receiving said start signal, performing a an interception operation to intercept said write operation, and to write data to a secondary storage area of the storage means so as to preserve original data which would otherwise be overwritten by said write operation, maintaining a record of said writing to the secondary area and, on performing one of said backup and said normal read operations, interrogating said record to read data from one of the primary and the secondary storage area according to the record, whereby the backup process is provided with preserved original data in the state it was in before the start signal was issued.

According to a third aspect of the invention, an improvement to a microprocessor-based computer system comprising a random access memory, a central processing unit and storage means comprises means for executing a backup process operable to issue a start signal and a stop signal and to perform at least one backup read operation to read original data from said storage means, means for causing said central processing unit to perform at least one normal write operation to write data periodically to a primary area of said storage means, and at least one normal read operation to read data from said storage means, means for receiving said start signal, means for performing, after receipt of said start signal, an interception operation to intercept said write operation, for writing data to a secondary storage area of said storage means so as to preserve original data which would otherwise be overwritten by said write operation, for maintaining a record of said writing to said secondary area and means for interrogating said record to read data from one of said primary and said secondary storage areas according to said record, whereby on performance of one of said backup and normal read operations, said backup process is provided with preserved original data in the state it was in before said start signal was issued.

The invention will be described below by way of example with reference to the drawings.

DESCRIPTION OF THE PREFERRED EMBODIMENT OF THE INVENTION

Figure 1:
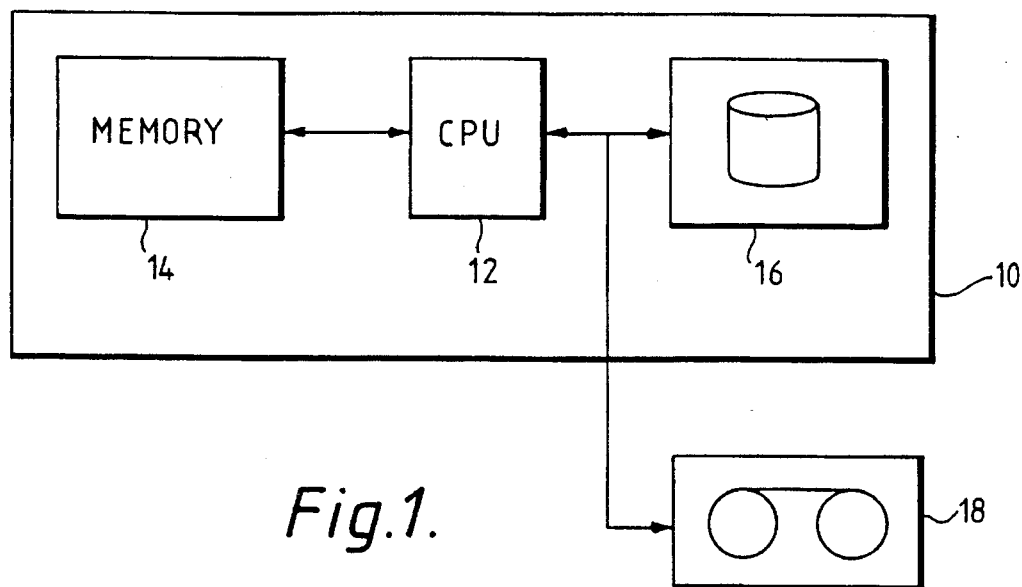
FIG. 1 is a block diagram of a personal computer and a cartridge tape drive.

Referring to FIG. 1 of the drawings, a personal computer 10 typically comprises a central processing unit 12, a random access memory 14, and a non-volatile storage device in the form of a hard disk drive 16. In this example, for the purpose of providing backup storage means, a tape unit 18 is coupled to the computer 10.

In accordance with the invention, part of a backup program application is formed as a recording process which operates to intercept normal read and write operations from and to the disk drive 16 respectively, in order to control the flow of data between the disk drive 16 and the other parts of the computer 10.

Before starting to make a backup copy of a file, the recording process is activated by the backup application to re-direct all disk write activity to another area of the disk 16 known as a "delta" area. A delta mapping table is maintained of all disk write operations that have been redirected to the delta area. This table maintains a mapping between the intended destination on the disk 16, of the data associated with each disk write operation and of its actual storage position in the delta area. If a subsequent write operation occurs to an area that is already the subject of an entry in the table, the old data in the delta area is allowed to be overwritten by the new data. In this way, the data on the main part of the disk does not change while a backup copy is being made, since all changes are re-directed to the delta area.

When a disk read operation is requested by the backup application, it is passed through unchanged so that the data returned to the backup application comes from the original data area on the main part of the disk. However, when a disk read operation is requested by another application, the recording process first operates to check the table to see if a disk write to that area has occurred since the process started intercepting write operations and, if so, the read operation is re-directed to the corresponding position in the delta area. If no write operation has occurred i.e. that piece of data has not been altered since the write operation interception started, then the read operation is passed through unchanged.

In this way, changes to data stored on the disk 16 are seen normally by all applications other than the backup application. The backup application sees data that will not change until an instruction is issued to stop the recording process intercepting read and write operations.

When the backup copying operation has finished, the recording process is activated to return the computer to normal operation. This restoration phase is achieved by applying the changes stored in the delta area to the appropriate original data areas in the main part of the disk 16 using the mappings stored in the table. While the delta changes are being applied, disk write operations continue to be intercepted as described above. When there are no more write operations that have not been applied to the original data area, the interception of write operations is halted and the system operates conventionally.

As a further improvement, if a record is kept of the extent to which the backup copying process has progressed, the software can allow write operations to the main part of the disk 16 to pass through unchanged after that part of the disk has been backed up since it will no longer matter if the data changes. This reduces the size of the delta mapping table. Also if the area on the main part of the disk to which that operation is directed was already the subject of an entry in the mapping table, that entry may simply be deleted thereby reducing the time taken in the restoration phase.

Figure 2A:
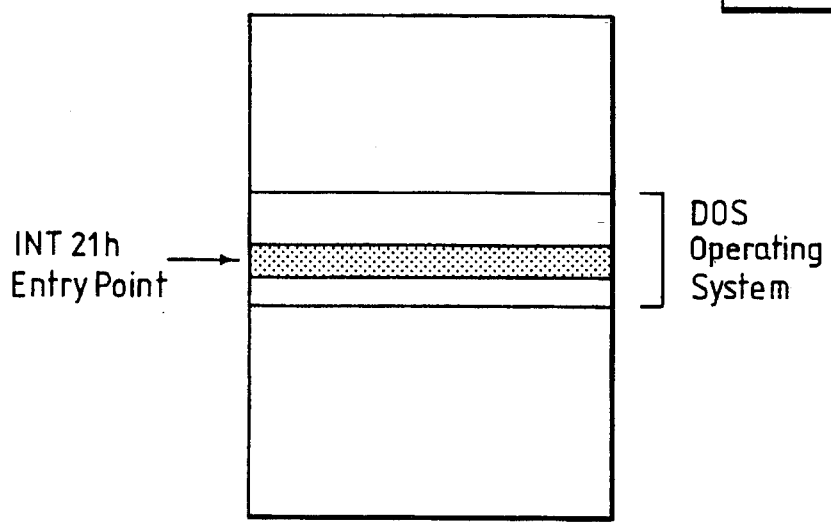
FIGS. 2A and 2B are diagrams illustrating a system memory map at the operating system level of a conventional personal computer and a computer modified to operate in accordance with the method of the invention respectively.
Figure 2B:
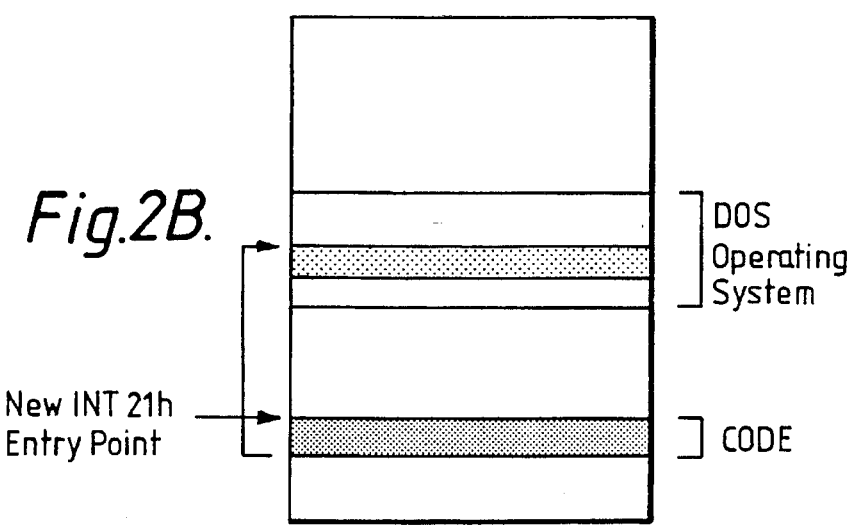

The invention is particularly applicable to IBM compatible personal computers, i.e. the majority of personal computers using processor chip type numbers 8086, 8088, 80286, 80386, 80486 and Pentium manufactured by Intel and similar microprocessor based systems. In such computers, whenever a program wishes to access a file it calls a standard routine which writes data to the disk. This routine, which in the case of the DOS operating system is known as Interrupt 21 hex (INT21h) is an integral part of the operating system. The action performed by the routine depends on the parameters passed to the routine upon entry. This routine is shown in FIG. 2A as INT21h forming part of the operating system in a system memory map, the INT21h entry point being shown by an arrow. To carry out a preferred method in accordance with the invention, additional program code is added at the operating system interface level as shown in FIG. 2B. In practice, in a DOS environment, this can be loaded into the computer as a device driver using the CONFIG.SYS file.

The added software has the effect of an instruction to write data being replaced by an alternative set of instructions. A similar technique may be used to intercept an instruction to read data from the disk and to replace this also with an alternative set of instructions.

Figure 3:
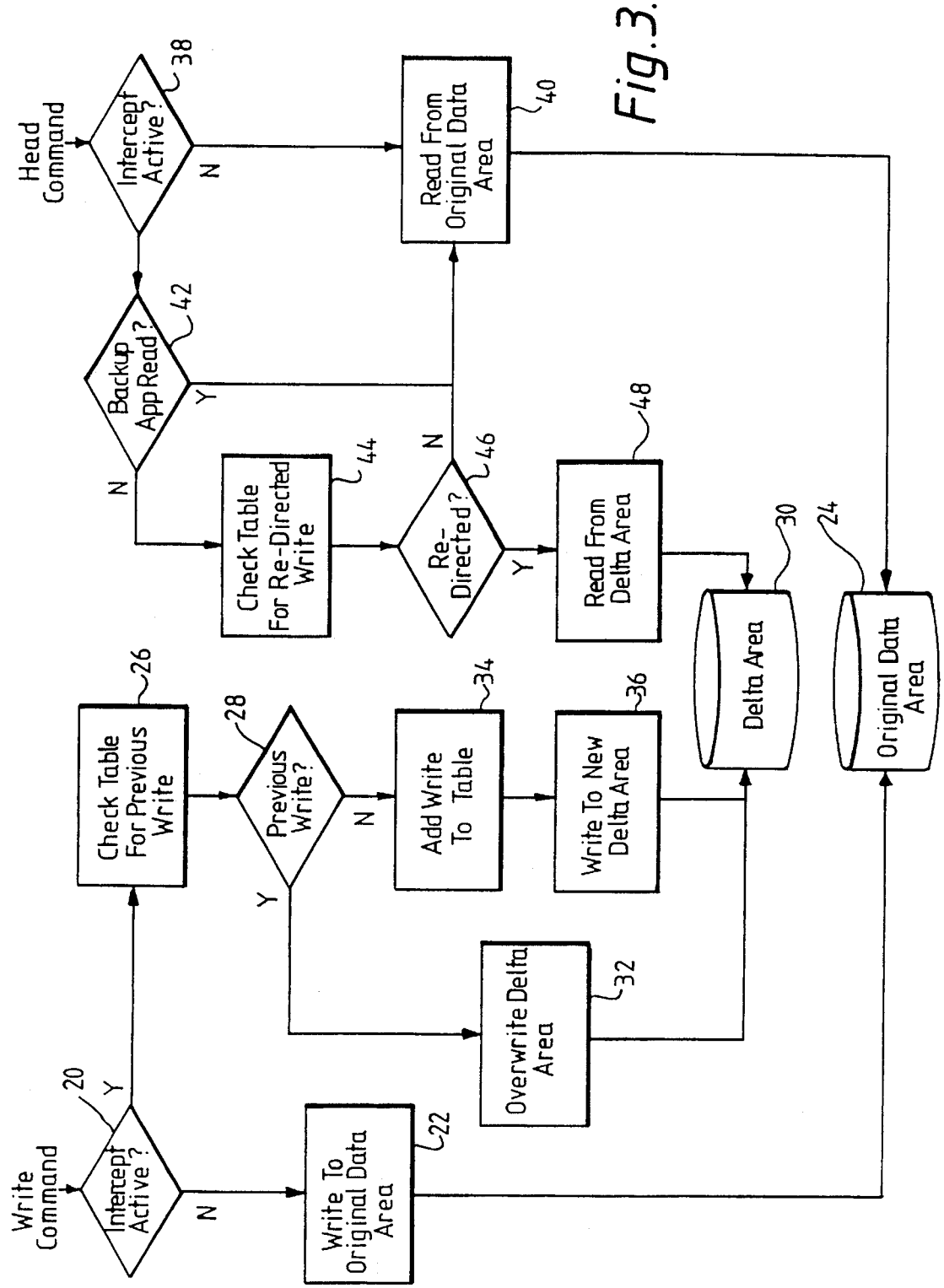
FIG. 3 is a flow chart of a method for recording data in a backup operation.

The relevant sequence of operations is shown in the flow chart of FIG. 3. On receipt of an INT21h call, the program first checks, whether the call is a write call. If it is, the program checks in step 20 to see if it is supposed to be intercepting write calls. If not, data is written (step 22) to the original data area 24.

If write calls are being intercepted, then the program checks the delta mapping table (step 26) to see if a write has previously been made to that area of the original file 24. If (step 28) a write has been made previously, then that part of the delta area 30 previously mapped to that part of the original file 24 in the delta mapping table, is overwritten with the new data (step 32).

If write calls are being intercepted but a write has not previously been made to that part of the original file 24 then the write is added to the table and a new area of the delta area is allocated to that piece of data (step 34). The data is then written to the new delta area (step 36).

If the call is a read call, the program checks in step 38 whether it is supposed to be intercepting read calls. If it is not, then data is read from the original file 24 (step 40).

If the program is intercepting read calls, then it first checks in step 42 to see if the call came from the backup application program. If the call did come from the backup application, the program passes to step 40 and data is read from the original file 24.

If the read call did not come from the backup application, the program checks the delta mapping table to see if a write to the area of the original file 24 corresponding to that of the read call, has been re-directed to the delta area (step 44). If it has not been re-directed (step 46) the program passes back to step 40 and the data is read from the original file 24. If the read has been re-directed, the data is read from the correct part of the delta area 30 (step 48).

In a second embodiment of the invention, when read and write operations are being intercepted during the recording process, instead of storing the changed data in the delta area, when the first write to a particular area of a file is made, the original data is stored in the delta area and the original file is allowed to be changed. An entry is made in the mapping table which points to the original contents of that area of the original file which is now stored in the delta area. Any subsequent write to the same area of the file is then ignored by the recording process. Read requests from the backup application are then re-directed to the delta area if the mapping table indicates that that area of the original file has been overwritten.

Figure 4:
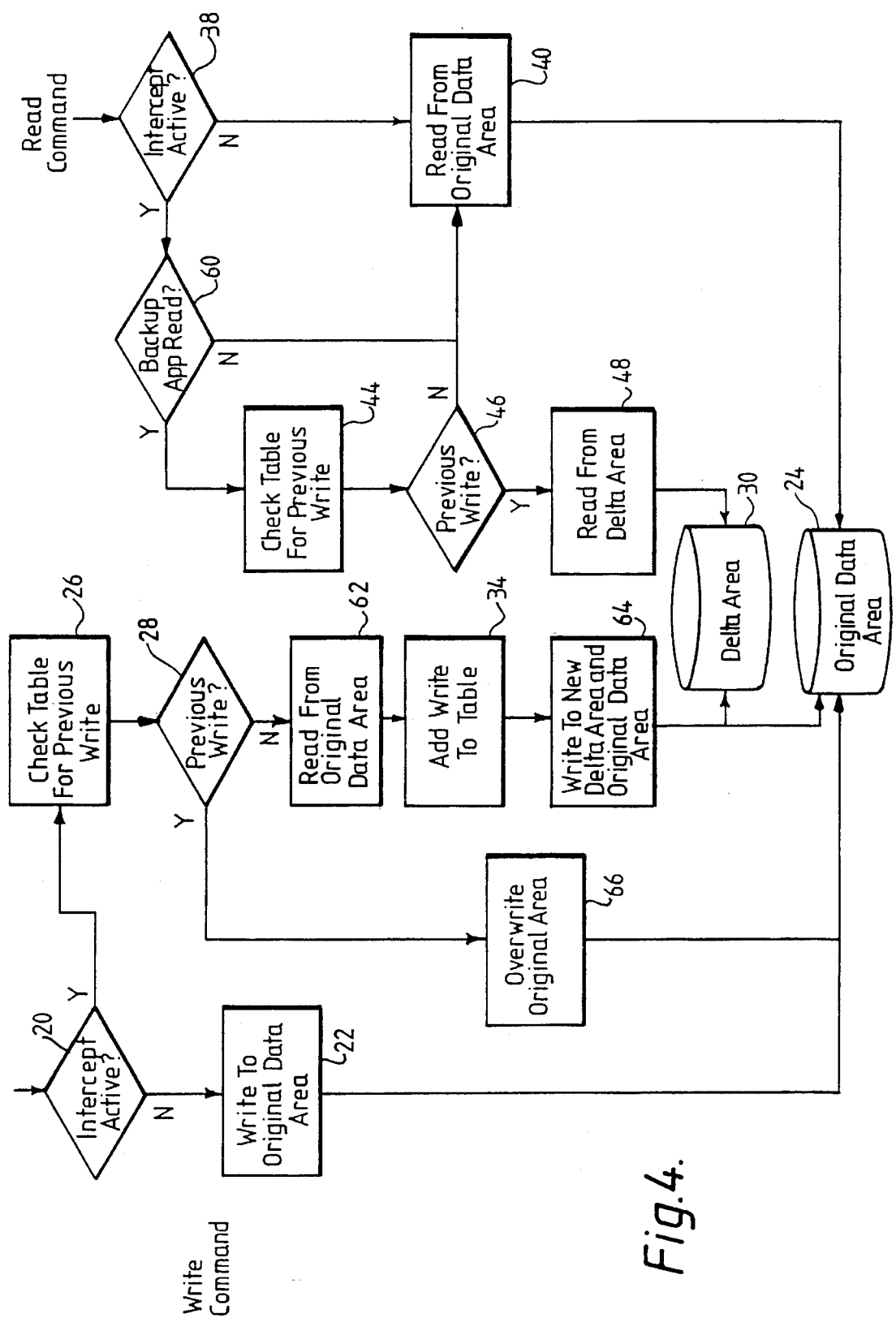
FIG. 4 is a flow chart of a second embodiment of the method of FIG. 3.

In FIG. 4, the second embodiment is represented in a flow-chart. The chart is similar to that of FIG. 3 with steps having the same reference numeral denoting a similar action.

The differences between the two figures (3 and 4) are as follows:

In step 60, if read intercept is active (step 38) and the read is not from the backup application, the data is read from the original data area. This is the reverse of step 42 in the previous embodiment.

An extra step 62 is inserted after step 28 which reads data from the original data area before it is overwritten for the first time.

Step 36 of the first embodiment is modified to form new step 64 which incorporates an additional write to the delta area of the data read in step 62.

Step 32 is modified to form new step 66 which no longer redirects the data to overwrite the delta area but instead writes the data to over the original data area.

This second method is slower than the first since each file write request becomes a read and two writes as opposed to the single re-directed write of the first method. However the second method does not require the changes stored in the delta area to be applied to the original file once the backup is complete. The delta mapping table and the data stored in the delta area may simply be discarded. Additionally because of this difference, provision does not need to be made to recover from a fatal condition (such as a power failure) occurring when the delta changes have not been fully applied to the original data.

In the case where the method described above forms part of a backup application, the interception of read operations can take place within the backup application and need not involve the use of an operating system routine.

When the computer environment permits the identification of a particular user who wishes to perform a backup, the method may also include the steps of recognizing the user and only backing up that user's files in the way described above. In this way it is not necessary to intercept all data transactions but only those relating to that user.

What is claimed is:

1. A method of operating a microprocessor-based computer system including a random access memory, a central processing unit and storage means, the method comprising the steps of:

providing a backup process running on the computer system and which is operable to issue a start signal and a stop signal and to perform at least one backup read operation to read original data from the storage means, providing first instructions stored in said memory to said central processing unit to cause said central processing unit to perform at least one normal write operation to write data periodically to a primary area of said storage means, and at least one normal read operation to read data from said storage means, after receiving said start signal, performing an interception operation to intercept said write operation, and to write data to a secondary storage area of the storage means so as to preserve the original data which would otherwise be overwritten by said write operation, maintaining a first record of said writing to the secondary area and, on performing one of said backup and normal read operations, interrogating said first record to read data from one of the primary and the secondary storage areas according to the first record, whereby the backup process is provided with preserved original data in the state it was in before said start signal was issued and including, after said start signal, keeping a second record indicative of the extent to which said backup process has progressed, and, on receipt of instructions for a write operation of said storage means, determining from said second record whether the portion of said primary area of said storage means that is to be written to has been backed up by said backup process, and, if said portion has been backed up, allowing said write operation to write to said primary area of said storage means without said write operation being intercepted.

2. A method according to claim 1, wherein the data of the normal write operation is written to said secondary area, and wherein the first record comprises a record of the intended location for said normal write operation in said primary area and a record of its actual location in said secondary area, and wherein said method further comprises the step of obtaining said preserved original data from said primary area.

3. A method according to claim 2, further comprising the steps of:

after receiving said stop signal, performing at least one restoration read operation to read data from said actual location in said secondary area and at least one restoration write operation to restore that data to its intended location in said primary area according to said first record, when all data has been restored to its intended location in said primary area, ceasing to perform said interception operation to intercept said write operation.

4. A method according to claim 2, wherein said primary and said secondary areas are different areas of a single storage device.

5. A method according to claim 1, wherein data to be preserved is read from said primary area and written to said secondary area before the data of the normal write operation is written to said primary area, and wherein the first record comprises a record of a former location of the original data in said primary area and a record of its actual location in said secondary area, and wherein the method further comprises the step of obtaining said preserved original data from said actual location.

6. A method according to claim 5, further comprising the step of:

after receiving said stop signal, ceasing to perform said interception operation to intercept said write operation.

7. A method according to claim 5, wherein said primary and said secondary areas are different areas of a single storage device.

8. A method according to claim 1, wherein instructions associated with the interception operation are performed at the level of a basic input/output system (BIOS).

9. A method according to claim 1, wherein instructions associated with the interception operation are performed at the level of an operating system interface.

10. A method according to claim 1, wherein said start signal is issued prior to said backup process starting to perform a backup operation on said storage device and wherein said stop signal is issued after said backup process has finished said backup operation.

11. A method according to claim 1, further comprising the step of deleting, during the backup process and in response to a further write instruction, from said first record, any entries relating to portions of said primary are of said storage means which have been backed up by said backup process.

12. A method of operating a microprocessor-based computer system including an instruction memory, a central processing unit and a storage means, the method comprising the steps of:

providing a backup process, running on the computer system, which is operable to issue a start signal and a stop signal;

providing first instructions stored in said memory to said central processing unit to cause said central processing unit to perform at least one normal write operation to write data periodically to a primary storage area of said storage means; and after receiving said start signal, performing an interception operation to intercept said write operation and, in such intercepted write operation, to write data intended for a portion of said primary storage area of said storage means to a portion of a secondary storage area of said storage means, while maintaining a record of said writing to said secondary storage area and the portion of said primary storage area to which it corresponds;

said intercepted write operation comprising the step of interrogating said record to determine whether there has been a previous intercepted write operation which concerns the writing of data intended for the same portion of said primary storage area as said current intercepted write operation, and (a) if so, overwriting with new data that write data which was previously written to said portion of said secondary storage area of said storage means in said previous intercepted write operation, and (b) if not, adding to said record and writing said new data to said secondary storage area;

whereby the backup process maintains a copy of the preserved original data in the state it was in before said start signal was issued.

13. A method according to claim 12, further comprising the steps of:

performing at least one restoration read operation, after receiving said stop signal, to read data from said secondary area and at least one restoration write operation to restore that data to its intended location in said primary area according to said record, and ceasing to perform said interception operation to intercept said write operation when all data has been restored to its intended location in said primary area.

14. A method of operating a microprocessor-based computer system including an instruction memory, a central processing unit and a storage means, the method comprising the steps of:

providing a backup process, running on the computer system, which is operable to issue a start signal and a stop signal;

providing first instructions stored in said memory to said central processing unit to cause said central processing unit to perform at least one normal write operation to write data periodically to a primary storage area of said storage means; and after receiving said start signal, performing an interception operation to intercept said write operation and, in such intercepted write operation, prior to writing new data to a portion of said primary storage area of said storage means, reading data in said portion of said primary storage area and writing it to a portion of a secondary storage area of said storage means, while maintaining a record of said writing to said secondary storage area and the portion of said primary storage area to which it corresponds;

said intercepted write operation comprising the step of interrogating said record to determine whether there has been a previous intercepted write operation which concerns the writing of data in the same portion of said primary storage area as said current intercepted write operation, and:

(a) if so, overwriting with new data that write data which was previously written in said primary storage area of said storage means in said previous intercepted write operation, and (b) if not, reading data to be preserved from said primary storage area and writing it to said secondary storage area, adding to said record, and writing said new data to said primary storage area;

whereby the backup process maintains a copy of the preserved original data in the state it was in before said start signal was issued.

15. A method according to claim 14, further comprising the steps of:

performing at least one restoration read operation, after receiving said stop signal, to read data from said secondary area and at least one restoration write operation to restore that data to its intended location in said primary area according to said record, and ceasing to perform said interception operation to intercept said write operation when all data has been restored to its intended location in said primary area.

16. Apparatus for operating a microprocessor-based computer system including an instruction memory, a central processing unit and a storage means, the apparatus comprising a backup means which is operable to issue a start signal and a stop signal;

means for providing first instructions stored in said memory to said central processing unit to cause said central processing unit to perform at least one normal write operation to write data periodically to a primary storage area of said storage means; and means, after receiving said start signal, for performing an interception operation to intercept said write operation and, in such intercepted write operation, to write data intended for a portion of said primary storage area of said storage means to a portion of a secondary storage area of said storage means, while maintaining a record of said writing to said secondary storage area and the portion of said primary storage area to which it corresponds;

said performing means further comprising means for interrogating said record to determine whether there has been a previous intercepted write operation which concerns the writing of data intended for the same portion of said primary storage area as said current intercepted write operation, and (a) if so, overwriting with new data that write data which was previously written to said portion of said secondary storage area of said storage means in said previous intercepted write operation, and (b) if not, adding to said record and writing said new data to said secondary storage area;

whereby the backup means maintains a copy of the preserved original data in the state it was in before said start signal was issued.

17. Apparatus for operating a microprocessor-based computer system including an instruction memory, a central processing unit and a storage means, the apparatus comprising:

a backup means which is operable to issue a start signal and a stop signal;

means for providing first instructions stored in said memory to said central processing unit to cause said central processing unit to perform at least one normal write operation to write data periodically to a primary storage area of said storage means; and means, after receiving said start signal, for performing an interception operation to intercept said write operation and, in such intercepted write operation, prior to writing new data to a portion of said primary storage area of said storage means, reading data in said portion of said primary storage area and writing it to a portion of a secondary storage area of said storage means, while maintaining a record of said writing to said secondary storage area and the portion of said primary storage area to which it corresponds;

said performing means further comprising means for interrogating said record to determine whether there has been a previous intercepted write operation which concerns the writing in the same portion of said primary storage area as said current intercepted write operation, and (a) if so, overwriting with new data that write data which was previously written in said primary storage area of said storage means in said previous intercepted write operation, and (b) if not, reading data to be preserved from said primary storage area and writing it to said secondary storage area, adding to said record, and writing said new data to said primary storage area;

whereby the backup means maintains a copy of the preserved original data in the state it was in before said start signal was issued.

18. A method for providing data to a backup process executing on a microprocessor-based computer system, the system including a random access memory, a central processing unit and storage means, the method comprising the steps of:

providing first instructions stored in said memory to said central processing unit to cause said central processing unit to perform at least one normal write operation to write data periodically to a primary area of said storage means, and at least one normal read operation to read data from said storage means, receiving a start signal from the backup process, after receiving said start signal, performing an interception operation to intercept said write operation, and to write data to a secondary storage area of the storage means so as to preserve original data which would otherwise be overwritten by said write operation, maintaining a first record of said writing to the secondary area and, on performing one of said backup and said normal read operations, interrogating said first record to read data from one of the primary and the secondary storage area according to the first record, whereby the backup process is provided with preserved original data in the state it was in before the start signal was issued and including, keeping a second record indicative of the extent to which said backup process has progressed, and, on receipt of instructions for a write operation of said storage means, determining from said second record whether the portion of said primary area of said storage means that is to be written to has been backed up by said backup process, and, if said portion has been backed up, allowing said write operation to write to said primary area of said storage means without said write operation being intercepted.

19. A method according to claim 18, further comprising the step of deleting, during the backup process and in response to a further write instruction, from said first record, any entries relating to portions of said primary area of said storage means to which the further write instruction refers, which have been backed up by said backup process.

20. In an improved microprocessor-based computer system comprising a random access memory, a central processing unit and storage means, the improvement comprising:

means for executing a backup process operable to issue a start signal and a stop signal and to perform at least one backup read operation to read original data from said storage means, means for causing said central processing unit to perform at least one normal write operation to write data periodically to a primary area of said storage means, and at least one normal read operation to read data from said storage means, means for receiving said start signal, means for performing, after receipt of said start signal, an interception operation to intercept said write operation, for writing data to a secondary storage area of said storage means so as to preserve original data which would otherwise be overwritten by said write operation, for maintaining a first record of said writing to said secondary area, and means for interrogating said first record to read data from one of said primary and said secondary storage areas according to said first record, whereby on performance of said backup operation, said backup process is provided with preserved original data in the state it was in before said start signal was issued and including means, operable after said start signal, for keeping a second record indicative of the extent to which said backup process has progressed, and means, operative on receipt of instructions for a write operation of said storage means, to determine from said second record whether the portion of said primary area of said storage means that is to be written to has been backed up by said backup process, and, if said portion has been backed up, to allow said write operation to write to said primary area of said storage means without said write operation being intercepted.

21. The apparatus as claimed in claim 20, further comprising means, operative during said backup process and in response to a further write instruction, for deleting from said first record, any entries relating to portions of said primary area of said storage means to which said further write instruction refers, which have been backed up by said backup process.

* * * * *